Jan. 27, 1970 F. S. VIGLIANTE 3,492,430

COMMON CONTROL COMMUNICATION SYSTEM

Original Filed Jan. 26, 1965 3 Sheets-Sheet 1

INVENTOR
F.S. VIGLIANTE
BY
R. C. Winter
ATTORNEY

COMMON CONTROL COMMUNICATION SYSTEM

Original Filed Jan. 26, 1965

United States Patent Office 3,492,430

Patented Jan. 27, 1970

3,492,430

COMMON CONTROL COMMUNICATION SYSTEM

Frank S. Vigliante, Piscataway Township, Middlesex County, N.J., assignor to Bell Telephone Laboratories, Incorporated, New York, N.Y., a corporation of New York Continuation of application Ser. No. 428,111, Jan. 26, 1965. This application Nov. 1, 1968, Ser. No. 774,571
Int. Cl. H04j; H04m 3/00, 3/60
U.S. Cl. 179—15 6 Claims

ABSTRACT OF THE DISCLOSURE

A switching arrangement is disclosed for interconnecting telephone lines in a private branch exchange system. The system consists of independent switch units each terminating a distinct group of lines and having an arrangement for scanning the lines to detect changes in line condition. Such changes are reported to a remote control unit which thereupon directs the switch unit to connect lines through the switching arrangement. The line capacity of the switch unit is increased by terminating the corresponding group of lines on a space division switching network and completing the interconnection of calling and called lines through a time division switching network via links interconnecting the space division and time division switching networks.

Figure 1:
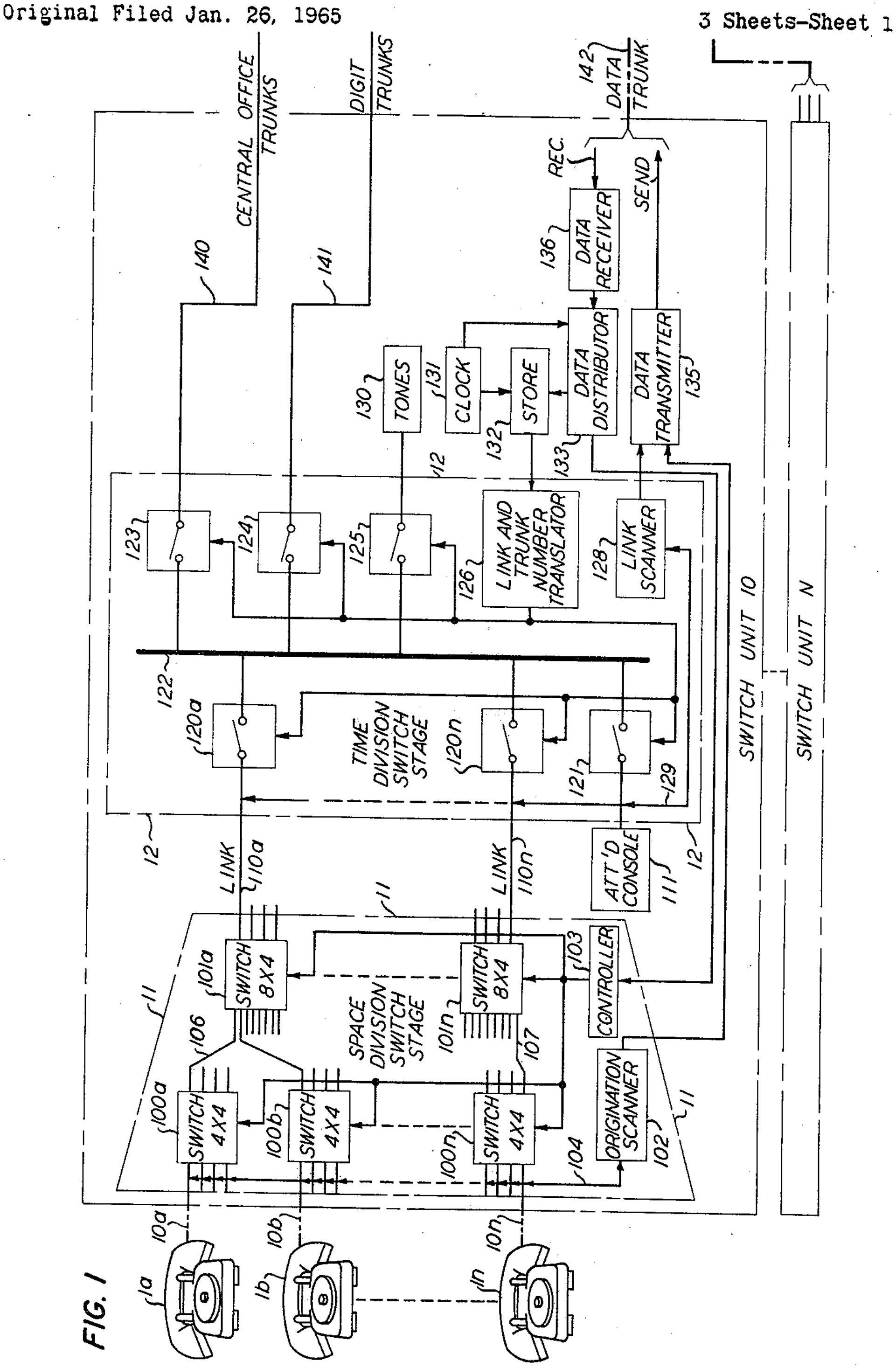

This is a continuation of application Ser. No. 428,111 filed Jan. 26, 1965, and relates to communication switching systems and more particularly to switching facilities in an electronic private branch exchange system.

Private branch exchange systems, termed PBX's hereinafter, are telephone switching systems which are designed to serve a relatively few extensions assigned to a single customer. Contemporary PBX's normally have the entire exchange equipment, including switching network and control circuitry, located on the customer's premises. Such an arrangement, however, fails to take advantage of the inherent high speed capabilities of currently available electronic control circuitry. The contrast is evident when comparing such PBX's with a system of the type which utilizes a common control unit for a plurality of PBX switch units.

Such an arrangement is disclosed, for example, by R. C. Gebhardt et al. in patent application Ser. No. 195,199, filed May 16, 1962, now Patent 3,225,144, issued Dec. 21, 1965. In this PBX, data is transmitted to a common control unit from a plurality of satellite switch units for processing, after which operating instructions are returned to the switch units for implementation. These instructions direct switching operations which serve to interconnect pairs of lines in communication on a time division basis. The switch unit thus may serve a single customer, and a number of customers may be served economically by a single common control unit.

Each switch unit in this arrangement is restricted to serving a maximum number of lines, the limitation being dictated by the nature of the internal time division operation and not by control unit parameters. The control unit, utilizing electronic components, can tolerate many times the amount of traffic which a single switch unit can provide. Thus the particular advantage of the Gebhardt et al. arrangement lies in the ability of the common control unit to accommodate a large number of individual switch units.

Due to the inherent limitations on the switch unit, the requirements of a customer whose demand outgrows the upper limit on the input of the corresponding switch unit are not easily satisfied. For example, provision of a second switch unit to such a customer would prove uneconomical if only a few additional lines beyond the switch unit capacity were required at the present time. A line circuit for a time division switching network is relatively more expensive than that terminating on a space division switching network. Furthermore, trunking among switch units is at a premium, and the use of such trunks for interconnecting multiple switch units of the same customer would be wasteful. Similarly, since this system requires a distinct data link between the control unit and each switch unit, the number of data links connecting one customer's switch units to the control unit would be increased unnecessarily in that data link usage is such that a single link might control a plurality of switch units.

Another aspect of the problem involves traffic handling capacity. A switch unit may, for example, accommodate up to twenty-four simultaneous calls. Thus an additional switch unit on the customer's premises would enlarge the capacity to forty-eight simultaneous calls. However, this capacity is realized only when one of the parties to each call is located in the local PBX. As a practical matter, of course, a PBX customer will experience a large percentage of intra-PBX calls. From an equipment standpoint, each such intra-PBX call represents two simultaneous calls. Conceivably, then, the capacity of two or more switch units serving one PBX customer may be as low as twenty-four simultaneous calls, the same capacity as accommodated by a single switch unit, this situation existing whenever all of the calls at any particular time are intra-PBX calls.

Thus the principal problem for which this invention affords a solution is how to accommodate a PBX customer efficiently and economically in a system having a control unit common to a plurality of remote, time division switch units, when the customer outgrows the capacity of a single switch unit.

It is a general object of this invention to provide an improved private branch exchange switching system wherein the inherent capabilities of electronic control apparatus are fully utilized.

It is another object of this invention to improve the operation of the switch unit facility in a private branch exchange.

More particularly, it is an object of this invention to minimize the cost of expanding switch unit facilities available to a private branch exchange customer.

It is another object of this invention to increase the flexibility of private branch exchange systems.

It is a further object of this invention to utilize stored program techniques to optimum advantage in the common control facility in the processing of calls through a switch unit.

These and other objects of this invention are achieved in one specific illustrative embodiment incorporated in a telephone system having a plurality of isolated switch units, each serving a plurality of telephone stations, the control functions of the switch units being performed by a common control facility remote from the switch units. A system of this type is disclosed in the aforementioned R. C. Gebhardt et al. patent.

The switch unit of the instant embodiment is in two stages; the first stage is substantially as disclosed by Gebhardt et al. and comprises a pulse amplitude modulation, time division switching network having a plurality of time division links. The second stage comprises a line concentrator of the type disclosed, for example, in K. S. Dunlap et al. patent application Ser. No. 295,458, filed July 16, 1963, now Patent 3,281,539, issued Oct. 25, 1966 which terminates the customer's lines and concentrates them to a lesser number of links connected to the first stage. The lines are scanned by an origination scanner serving, as its name implies, to detect service requests by stations desiring to originate call connections. This information is transmitted to the control unit where it is utilized to locate an idle link between the first and second stages of the switch unit. The control unit thereupon transmits instructions to the switch unit to complete the connection through the concentrator, whereby giving the calling station access to the first stage of the switch unit.

The switch unit includes a second scanning circuit for determining all other supervisory states of the extensions and trunks. This scanning circuit observes signals on the links between the line concentrator stage and the time division stage of the switch unit. A record of the supervisory state of the links is maintained at the switch unit and appropriate supervisory information is transmitted to the control unit only after a change in supervisory state has occurred.

The supervisory data message from the switch unit to the control unit subsequent to the origination message comprises the address of the link corresponding to the active line which has changed supervisory state and an indication of its present state, i.e., on-hook or off-hook. The control data transmitted from the control unit to the switch unit in turn comprises orders to establish or disestablish connections, et cetera. A record of the correspondence between a link and an active line is maintained only in the control unit. Thus when an active connection is to be terminated, the identity of the link is transmitted from the switch unit to the control unit where it is utilized to address a particular storage unit to the location of the corresponding line. The line identity is utilized thereafter in formulating commands to the switch unit to disconnect the line and link connections at the line concentrator.

Various groupings and cross connections of links between a line concentrator and one or more of the time division stages of the switch unit may be utilized to satisfy the customer's particular requirements.

It is a feature of this invention that a switch unit comprise a two-stage switching network, the first or line concentrator stage comprising space division switches, and the second or interconnecting stage comprising time division switches.

It is a further feature of this invention that the PBX lines are scanned for originations only, the links between the switching stages being scanned for all other supervisory functions.

It is still another feature of this invention that the control unit utilize the originating line identity to locate an idle link, whereupon the connection through a line concentrator to the time division stage is established.

It is yet a further feature of this invention that the link idenity be utilized by the control unit to disconnect a line upon termination of a call.

It is a still further feature of this invention that a plurality of PBX switch units located at or near a customer's premises and controlled in common by a single control unit each terminate links of a corresponding line concentrator, which concentrator in turn terminates the customer's lines.

Figure 2:
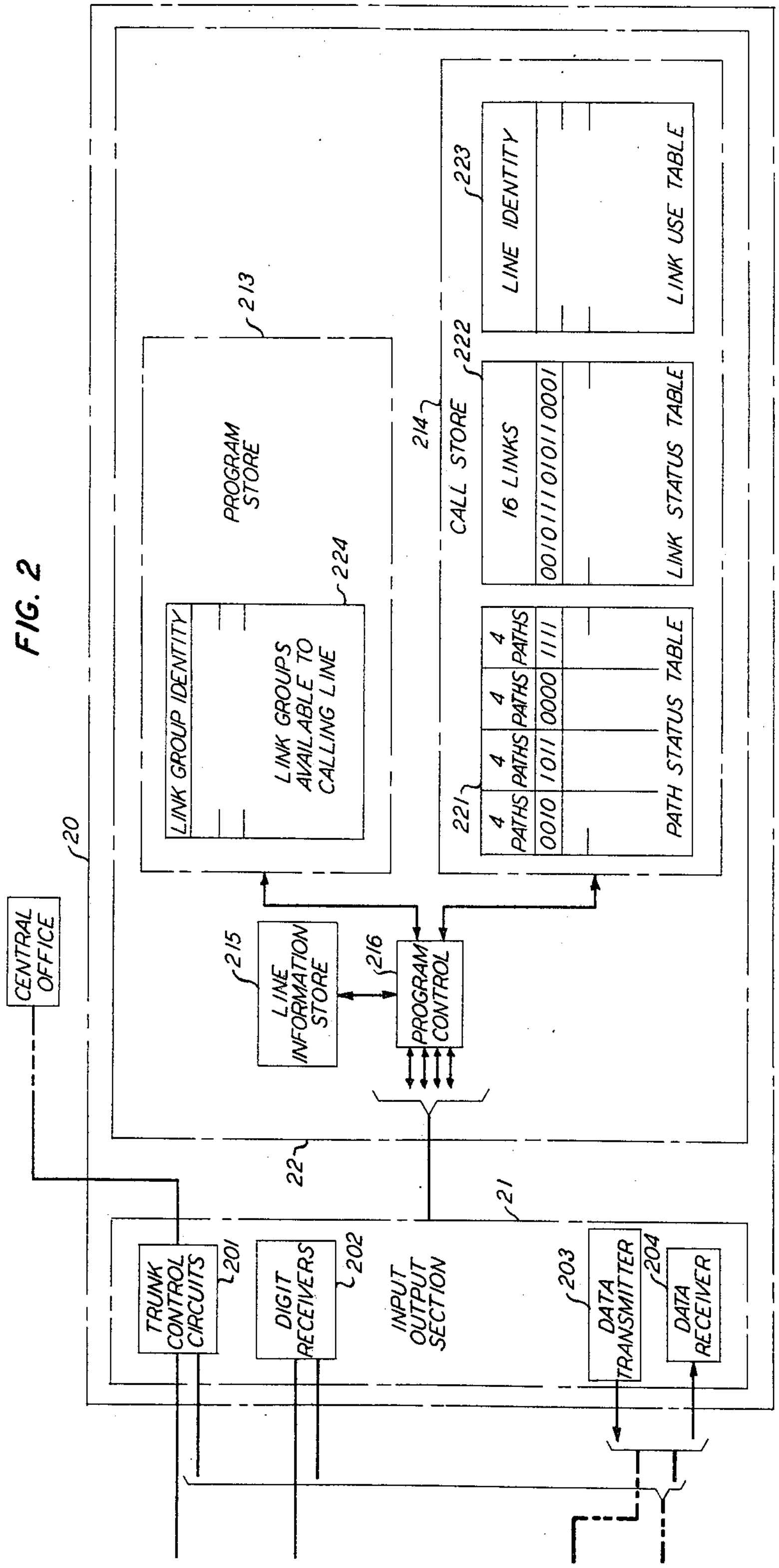
Figure 3:
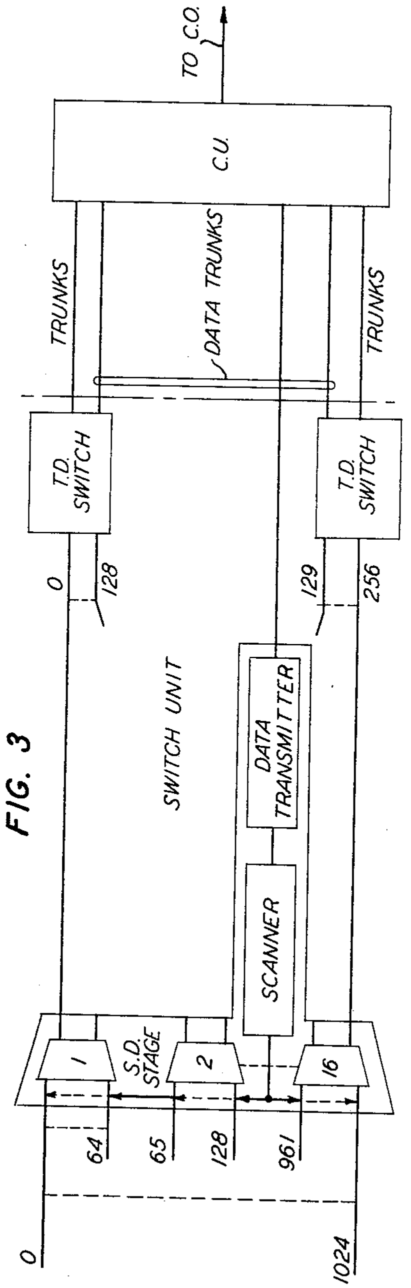
Figure 4:
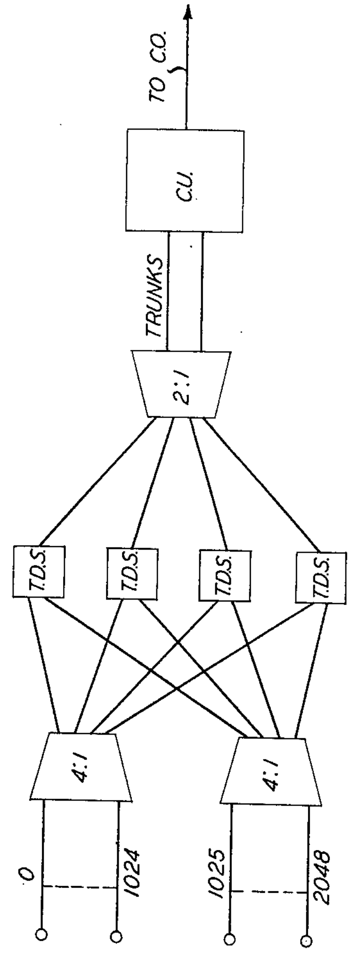

A complete understanding of this invention and of the above-noted and other features thereof may be gained from consideration of the following detailed description and the accompanying drawing, in which:

FIGS. 1 and 2 together form a block diagram representation of a private branch exchange system incorporating this invention; and FIGS. 3 and 4 are block diagram representations of alternative network arrangements of the system components in accordance with this invention.

Turning now to the drawing, the principal characteristics of one switch unit and the control unit for the electronic PBX system incorporating the invention are illustrated in FIGS. 1 and 2 respectively.

The control unit is essentially as described in F. S. Vigliante et al. Patent 3,268,669, issued Aug. 23, 1966, and the time division stage of the switch unit corresponds to the switch unit described in detail in the aforementioned Gebhardt et al. patent, but for purposes of understanding the over-all system operation, a brief description of the operation of these units as contained in the Seley et al. and Gebhardt et al. patents is provided hereinafter.

Contrary to the characteristic operation of self-contained PBX's in which the transmission circuits, switching network and control apparatus are all located together on a customer's premises, the instant system has a control unit 20 which directs the call processing in all of the remotely located switch units 10–N via corresponding data trunks. More specifically, the switch unit 10 informs the control unit 20 of all changes in the supervisory status of telephene lines, trunks and attendant console keys, e.g., whether they are idle (on-hook) or busy (off-hook). The control unit 20 then performs all of the decision-making tasks of call processing and directs the establishment of the connection of a calling party to a called party through the switching network contained in the switch unit 10.

The system, as depicted in the aforementioned Gebhardt et al. patent, contains a time division switch which is illustrated as the time division stage 12 in FIG. 1. Time division switching is based on the principle that periodic samples of information from one source are sufficient to completely define the information and that such samples of information from a number of different sources may be transmitted in a regular sequence over a single path shared in time by all of the sources. Thus, for example, a plurality of stations such as telephone subsets 1*a*–1*n* in FIG. 1 are connected via space division stage 11 to a common transmission bus 122 through corresponding gates 120*a*–120*n*, which gates are sampled on a selective basis for a predetedmined time interval in a recurrent cycle of time intervals. If a pair of gates is closed simultaneously for the prescribed time interval, thereby interconnecting a pair of stations, a sample of the information available at each station will be transferred to the other station via the common transmission bus 122. A bilateral connection is thus established which, although physically connected for only a small fraction of the time, appears to the conversing parties to be continuously connected due to the smoothing action of filters associated with the gates 120*a*–120*n*.

The number of simultaneous conversations which may be accommodated by the common transmission bus 122 is determined in part by the sampling rate required in order to provide a reproducible conversation. This sampling rate must be at least twice the maximum frequency to be transmitted. A 10 kilocycle sampling rate is quite common. Another factor to be taken into account is the length of the sampling interval or time slot. This interval must be sufficient to transfer samples of each party's conversation through the associated gates 120*a*–120*n* without significant loss. A suitable transfer interval has been found to correspond to one half-cycle at the resonant frequency of the transfer circuit. These factors, together with others, establish the number of available time slots and thereby set a maximum on the number of stations which may be associated with the single common transmission bus 100 considering system traffic requirements. A system of the type disclosed in the aforementioned Gebhardt et al. patent utilizes twenty-five time slots and accommodates a maximum of twenty-four simultaneous conversations. The upper limit, as established by traffic requirements of the customer, might be in the neighborhood of 100 extension lines 10*a*–10*n*.

It is this limiting feature of the time division stage as the switching network of the PBX which has led to the instant invention. Heretofore if a customer's requirements grew beyond the maximum allowable number of extension lines permitted by one switch unit, a second unit would be required on his premises although his needs might be for only a few additional lines beyond the capacity of one switch unit. The additional unit might afford only a slight increase in traffic handling capacity dependent upon the volume of intra-PBX calls. Also tie trunks between the first and second units would reduce the number of trunks available for connection to the central office. I have found that this requirement may be satisfied by the introduction of a second switching stage in the switch unit, which stage is of the space division variety familiar to the art. Thus space division switching stage 11 in FIG. 1 is connected between the indvidual extension lines 10 *a*–10*n* and the time division stage 12.

A space division switch suitable for use as stage 11 corresponds to the line switching frame described in detail in the aforementioned Dunlap et al. patent. This line switching frame concentrates lines through two stages of switching. The incoming lines terminate on switches 100*a*–100*n*, and the concentrated number of links 110*a*–110*n* connected to the time division stage 12 terminate on switches 101*a*–101*n*. To achieve 2-to-1 concentration, for example, thirty-two extension lines 10*a*–10*n* terminate on eight 4 x 4 switches 100*a*–100*n* and sixteen links 110*a*–110*n* terminate on four 8 x 4 switches 101*a*–101*n*. The cross connection paths between the first and second stages provide full access for all extensions to switches 101*a*–101*n*, with traffic concentration limited to these switches. 4-to-1 concentration may also be employed in such line link frames in which instance switches 100*a*–100*n* concentrate the extensions 4-to-1 and switches 110*a*–110*n* concentrate the interstage paths 2-to-1.

The switch unit 10 is connected to the control unit 20 by three types of transmission facilities; the first type is represented by the central office trunks 140 which connect the time division stage 12 to the systemwide telephone switching network at the central office via the trunk control circuits 201 in the control unit 20. Included in the central office trunks 140 are tie trunks which connect the switch unit 10 to other PBX switch units such as 10*n* via the control unit 20 and the central office. The trunk control 201 provides means for transmitting supervisory and call signaling information forward to the central office.

The second type of transmission facility connecting the time division stage 12 to the control unit 20 is represented by the digit trunks 141. These trunks provide a transmission path from a calling station associated with the switch unit 10 to digit receivers 202 in the control unit 20 which are provided for registering call signaling information other than switchhook flashes. The digit signals are transmitted from the calling station through the space division stage 11 to the time division stage 12 via one of the links 110*a*–110*n* and through the corresponding link gate 120*a*–120*n* to the selected digit trunk 141.

The third type of transmission facility is the data trunk 142 which comprises send and receive channels. The data send channel is unidirectional, connecting the time division stage 12 to the control unit 20 for the purpose of transmitting data relating to changes in the supervisory status of lines associated with the switch unit 10 to the control unit 20. Similarly, the data receive channel is unidirectional and serves to transmit control signals for the establishment and disestablishment of connections through the switch unit 10 from the control unit 20. The data send channel terminates in a transmitter 135 at the switch unit 10 and in a data receiver 204 included in the input-output section 21 of the control unit 20. Similarly, the data receive channel terminates in a data transmitter 203 in the control unit 20 and a data receiver 136 at the switch unit 10. Information is transmitted in both directions by means of frequency shift signals, i.e., signals of one frequency represent 0's in a digital message and signals of a second frequency represent 1's in the digital message.

With the introduction of a second stage of switching in accordance with this illustrative embodiment, the scanning function is divided into two distinct operations conducted by separate scanners. Thus the origination scanner 102, advantageously located in the space division switching stage 11, continually observes the condition of all of the lines 10*a*–10*n*. A second scanner 128 contained in the time division stage 12 continually observes the condition of all of the links 110*a*–110*n*. Both scanners report changes in the condition of the respective lines and links to the control unit 20 via the data transmitter 135 in a manner corresponding to that described for the scanner and last look memory circuit of the aforementioned Gebhardt et al. patent.

Briefly both scanners, in the process of sequential scanning, note any changes in supervisory state. Thus, with respect to the origination scanner 102, a change from on-hook to off-hook or vice versa is sought continuously by a cyclical observation of each line in sequence. When such a change is noted, the origination scanner 102 transmits a data message to the control unit 20 via the data transmitter 135 and data trunk 142, which message identifies the line in which the change in condition was observed, together with its current supervisory state.

Once having performed this function for the particular line going off-hook, the origination scanner 102 is divorced from subsequent operations toward establishment of the call connection. The link scanner 128 in the time division stage 12 continues the scanning process by observing the links 110*a*–110*n* for changes in supervisory state, viz. on-hook and switchhook flashes. Such changes in condition of the links are reported to the control unit 20 via the data transmitter 135 and data trunk 142, this time identifying the particular link and its current status.

The control unit 20 performs all of the logical functions required to process calls through each of the remote switch units 10–N. Its operation corresponds to that described in detail in the aforementioned Vigliante et al. application and is only described briefly herein for continuity. It comprises an input-output section 21 which communicates directly with each of the switch units 10–N via the data and digit trunks 142 and 141, respectively, and with the central office via the trunk control 201. It further comprises a section 22 which performs the actual call processing required to establish and supervise calls through the various switch units 10–N.

A single memory unit in the input-output section 21 receives and stores information from all of the switch units and is capable of working with all of the switch units simultaneously. The call processing section 22 on the other hand operates on one switch unit at a time and on one call at a time within a given switch unit. As each call is processed, any action required is formulated as a message and placed in the input-output section 21 for transmittal to the proper switch unit. The input-output section 21 comprises wired logic, as contrasted with the stored program which controls the call processing section 22.

The stored program is contained in the program store 213, one of the three stores that make up the call processing section. The call store 214 maintains a record of the instantaneous condition of each call connection, while the line information store 215 contains information concerning each line and trunk in the entire PBX, as well as ancillary information such as class of service to which a particular line is entitled, abbreviated directory numbers, et cetera. Such information is available upon request by the control logic 216 as desired in the processing of a particular call. When interrogated, line information store 215 will deliver the desired information to the call store 214 where further processing of the call will take place.

The call processing section 22 systematically interrogates the input-output section 21 for new information concerning a particular call that it is currently processing, such information including the aforementioned on- or off-hook messages as well as digit pulsing, switchhook flashes, et cetera. Following the instructions contained in the program store 213, the call processing section 22 interprets the data received from the switch unit 10–N originating the particular call being processed as temporarily stored in the input-output section 21 and subsequently informs the same switch unit via the input-output section 21 as to which connections to establish or disestablish in order to satisfy any indicated change of status in the instant call.

The call processing operation thus may be seen to comprise collecting information from the switch units, comparing such information with the current recorded status of a call, and advising the switch units to take appropriate action while updating the status of the call, each operation being under the control of instructions received from the stored program.

The departure from the operation of the control unit 20 to satisfy the requirements of this illustrative embodiment involves only the information contained in the program store 213 and the call store 214 which will be discussed in detail hereinafter. All of the other control unit operations correspond to the description contained in the aforementioned Vigliante et al. patent. Similarly, all of the operations concerning the time division stage 12 of the switch unit 10 are described in the aforementioned Gebhardt et al. patent, with the exception of the introduction of the origination scanner 102 to observe call originations on the lines 10*a*–10*n*.

The control portion of switch unit 10 consists of a store 132 to remember the calls in progress, which store is coupled through a translator 126 to activate the appropriate time division gates in switching stage 12. New information from the data distributor 133 is gated into the store 132 when the number of a particular time slot agrees with a particular store address. During a write cycle of the store 132, information is gated to the translator 126. The output of the translator is directed simultaneously to any predetermined pair of line and trunk gates, thus effecting their operation during a predetermined time interval.

The space division switch stage 11 is controlled in a similar manner. Signals specifying particular switches in stage 11 to be activated or deactivated are received from control unit 20 in data receiver 136 and transmitted to controller 103 via data distributor 133. The particular manner in which the controller 103 effects switch operations is considered in detail in the aforementioned Dunlap et al. patent.

The operation of the switch unit 10 may be understood more fully upon consideration of a typical intra-switch call. Let us assume that telephone 1*a* goes off-hook. This change of status is recognized by the origination scanner 102, which in turn formulates a message containing the corresponding line number, together with the new supervisory state. This information is transmitted to the control unit 20 via data transmitter 135 and the send channel of the data trunk 142.

The control unit 20, recognizing that there is no current call established which involves this particular line, determines that this off-hook indication is a request for service and proceeds to set up a dialing connection. For this purpose it must first determine the availability of an idle link 110*a*–110*n*. As indicated in FIG. 2, portions of the call store 214 and the program store 213 are arranged to store particular information calculated to permit the identification of such an idle link and its assignment to the call indication.

The call store contains a path status table 221 which maintains a record of the status of all paths between switches 100*a*–100*n* and switches 101*a*–101*n* in the space division stage 11. Knowledge of this status is essential before a selection of an idle link 110*a*–110*n* can be made, since it is through these interconnecting paths that the calling line has access to the links 110*a*–110*n*. The path status table 221 is addressed by the calling line 10*a* identification, which in this illustrative embodiment has four possible paths available between its corresponding switch 100*a* and the switches 101*a*–101*n*. These four paths are identified as being busy or idle in one of the distinct columns illustrated in the path status table 221.

Idle paths are indicated by the presence of a binary zero and busy paths by a binary one.

Using the line identification once again, table 224 in program store 213 is addressed in order to procure a constant designating a particular time division line group to which the calling line has access through a predetermined group of links. With this constant, link status table 222 in the call store 214 is addressed and the status of the appropriate group of links 110*a*–110*n* read out. The selected link group is overlaid with the busy paths noted in table 221 so as to mask out links connected to switches 101*a*–101*n* terminating busy paths. Through this arrangement, only those links 110*a*–110*n* which have access to the calling line 1 through idle paths between switches 100*a*–100*n* are examined, links corresponding to busy ones of the paths available to the calling line being masked out. The calling line identity is stored in link use table 223 of call store 214 at the address of the selected link. The identity of the selected link 110*a*–110*n* is then utilized by the call store 214 in subsequent processing of the call, and a message is sent to the switch unit 10 via the receive leg of the data trunk 142, specifying that line 10*a* is to be connected to the assigned idle link 110*a*–110*n*.

Let us assume that the selected link is link 110*a*. This message is received by the data receiver 136 and processed through the data distributor 133 and controller 103 so as to provide control signals to the space division stage 11 serving to interconnect switch 100*a* and switch 101*a*. This, in fact, provides a solid connection between line 10*a* and link 110*a* through the space division stage 11. The message also specifies the time slot assigned to this connection and that link 110*a* is to be connected to a preselected one of the digit trunks 141. The store 132 in the time division stage 12 registers this message and completes the connection by closing gates 120*a* and 124 during the assigned time slot in each succeeding repetitive cycle. At the same time control unit 20 proceeds to connect the assigned one of the digit trunks 141 to a digit receiver 202 in the input-output section 21 so as to transmit dial tone via the digit trunk to the calling station 1*a*.

The calling party now proceeds to dial or otherwise transmit the digits representing the called station (in this example station 1*n*). Upon completion of dialing, the control unit 20 again examines its records in the call store 214 and the program store 213 to identify an available link 110*a*–110*n* to the called line 10*n* terminated by the called station 1*n*. Upon location of such an idle link (in this instance link 110*n*) the message is sent to the switch unit 10 serving to establish the appropriate connection through the space division stage 11 via switches 101*n* and 100*n* to close a solid path from link 110*n* to line 10*n*.

The message also serves to remove the connection of the link 110*a* to the digit trunk and to establish instead a ringing connection to the called line, with audible ringing returned to the calling line by the simultaneous operation of gates 120*a*, 120*n* and 125, the latter being the gate connecting the time division bus 122 to the source of audible tones 130 in the switch unit 10.

When the called party answers, an off-hook message is sent to the control unit via scanner 128, in this instance identifying the link 110*n* and the corresponding status indication. The call store 214 recognizes this link 110*n* identification as being the called party to the connection registered in a particular time slot and thereupon stores the corresponding called line 10*n* identification in that time slot together with the link 110*n* identification. The control unit 20 returns a message to the switch unit 10 which terminates the ringing and establishes the talking connection by inhibiting the operation of the tone gate 125 in the time slot assigned to the called connection.

Upon receipt of a switchhook flash or either party going on-hook, scanner 128 will detect the change in supervisory status and report the new condition to control unit 20 together with the identification of the corresponding link 110*a*–110*n* on which the change occurs. Assuming, for example, that party 1*a* hangs up, scanner 128 will detect the change on link 110*a* and report the link identification together with the on-hook status to control unit 20. This message will be processed in the call processing section 22, the call store 214 containing all of the necessary information pertaining to the call involving link 110*a* to permit the connection to be discontinued.

Thus after passage of a predetermined period for receipt of an on-hook indication from link 110*a*, a message is transmitted from control unit 20 to switch unit 10 which identifies the particular switches 100*a*, 101*a*, 100*n*, 101*n* and gates 120 and 120*n* involved in this connection, with instructions that the particular connections through these switches and gates involving lines 10*a* and 10*n* and links 110*a* and 110*n* be discontinued.

The only exception to the foregoing routine in the establishment of call connections involves the attendant's console 111, which in this instance is identified directly by the scanner 128 rather than by the origination scanner 102. Thus the attendant's line circuit corresponds to a link circuit 110*a*–110*n*. However, its special identity is recognized by the control unit 20 as being an attendant's line and not a link serving one of the regular extension lines 10*a*–10*n*. It may be seen that all control operations are effected exclusive of the attendant's console 111. Thus the attendant's circuit is simply a translator for facilities for observing the condition of all system links and trunks. The attendant facilities, however, operate in the same fashion as any telephone in exercising supervision.

As indicated in the foregoing example, all changes in supervisory states result in a data message being transmitted from either the origination scanner 102 or the link scanner 128 in the remote switch unit 10 to the control unit 20 and an answering message from the control unit 20 being received in the switch unit 10 via the data trunk 142 and utilized by the control facilities at switch unit 10 to establish the appropriate space division switch connections through stage 11 and the appropriate time division connections through stage 12, the latter being accomplished repetitively in a predetermined time slot in each successive cycle of time slots. The content of the received message also determines its distribution in the switch unit 10 either to the appropriate switching network control or through the attendant translator to the attendant's console 111.

As indicated in FIG. 3, the time division stage in each switch unit may comprise several distinct time division switches linked to the control unit by distinct trunks and the space division stage may comprise a plurality of distinct line concentrators having access to each of the time division switches via cross connected links. As an example, FIG. 3 illustrates the concentration of 1,024 lines through sixteen space division switches each accommodating sixty-four lines with a 4-to-1 concentration to 256 links. The links are divided equally between two time division switches, each terminating 128 links. A single origination scanner serves the entire space division stage, and in this instance a separate data transmitter is illustrated as being located in the space division stage together with the origination scanner.

FIG. 4 illustrates another arrangement of the space and time division stages. In this instance 2,048 lines are concentrated through two space division switches and four time division switches. In addition a 2-to-1 concentration is performed on the central office trunks, which concentration is effected by a space division switch. Such a trunk concentration affords further system flexibility and is implemented in a manner corresponding to that described in connection with FIG. 1.

It is to be understood that the above-described arrangements are illustrative of the application of the principles of the invention. Numerous other arrangements may be devised by those skilled in the art without departing from the spirit and scope of the invention.

What is claimed is:

1. A communication system comprising a central office, a plurality of lines, a plurality of switch units, a plurality of trunks connected in distinct groups between said central office and said plurality of switch units and a control unit remote from and common to said switch units for directing the establishment of call connections through said switch units, each of said switch units comprising a plurality of links, a single conductor transmission bus, a switching network comprising a stage for providing selective solid connections between said links and a corresponding group of said lines for the duration of each individual call connection, and a stage for interconnecting said links via said bus in a periodically recurring time interval for the duration of each individual call connection, said control unit comprising means for directing the connection of said links selectively to said trunks.

2. A communication system comprising a plurality of lines, a switch unit terminating a group of said lines, and a control unit remote from said switch unit for directing the interconnection of said lines through said switch unit, said switch unit comprising a single conductor common bus, a first switching stage which establishes call connections via said common bus in a recurring time interval for the duration of each call, a plurality of links less in number than said lines extending from said first stage, a second switching stage for connecting said lines selectively to said links via solid paths for the duration of each call connection, and means for completing a connection between calling and called ones of said lines through said first and second stages, said completing means comprising means in said switch unit for scanning said lines for service requests, means for applying calling line identity information provided by said line scanning means to said control unit, means in said control unit responsive to receipt of said calling line identity for generating first link identity information and means in said switch unit responsive to receipt of said first link identity from said control unit for connecting a calling line through said second switching stage to a selected one of said links.

3. A communication system in accordance with claim 2, wherein said completing means further comprises means in said switch unit for scanning said links for all supervisory information other than service requests, means for applying called line identity information provided by said link scanning means to said control unit, means in said control unit responsive to receipt of said called line identity for generating second link identity information, means in said switch unit responsive to receipt of said second link identity from said control unit for connecting said second link to said first link through said first switching stage and to said called line through said second switching stage.

4. A communication system in accordance with claim 3, wherein said means for applying line identity information to said control unit comprises a single data trunk, said data trunk further transmitting said link identity information from said control unit to said switch unit.

5. A communication system in accordance with claim 4 and further comprising a plurality of other switch units, a plurality of trunks for interconnecting said switch unit with said other switch units and wherein said means in said control unit for generating second link identity information also generates trunk identity information in response to receipt of the identity of a called line associated with one of said other switch units and said means in said switch unit responsive to receipt of said second link identity further responds to receipt of a trunk identity from said control unit for connecting said trunk to said first link through said first switching stage.

6. A communication system comprising a plurality of lines, a plurality of switch units terminating distinct groups of said lines, a control unit remote from said switch units for directing the interconnection of said lines through one of said switch units and between pairs of said switch units, each of said switch units comprising a plurality of links, a plurality of trunks, a time division bus, a first switching network for connecting said links to said trunks and to others of said links via said bus in a recurring time interval for the duration of each call connection, a second switching network for providing solid connections from said lines to said links for the duration of each call connection, a line scanner for detecting service requests on said lines, a data trunk extending to said control unit, means for applying calling line identity information provided by said line scanner to said data trunk, means in said control unit responsive to receipt of said calling line identity for generating identity information for a first one of said links, means in said switch unit responsive to receipt of said first link identity from said control unit via said data trunk for connecting a calling line through said first switching network to said first link, a link scanner for detecting supervisory information on said links, means for applying called line identity information provided by said link scanner to said data trunk, means in said control unit responsive to receipt of said called line identity for generating identity information for a second link or for a trunk, means in said switch unit responsive to receipt of a second link identity from said control unit via said data trunk for connecting said second link to said first link and to said called line and reponsive to receipt of a trunk identity for connecting said first link to said identified trunk.

References Cited

UNITED STATES PATENTS

| | | | |
|---|---|---|---|
| 2,997,545 | 8/1961 | Hartley | 179—15 |
| 3,257,513 | 6/1966 | Feiner | 179—18 |

KATHLEEN H. CLAFFY, Primary Examiner

A. B. KIMBALL, Jr., Assistant Examiner

U.S. Cl. X.R.

179—18, 27